United States Patent [19]
Gratzmuller

[11] 3,958,963
[45] May 25, 1976

[54] FILTER FOR LIQUIDS CAPABLE OF CONTAINING A GAS

[76] Inventor: Jean Louis Gratzmuller, 66 Boulevard Maurice Barres, 92200 Neuilly-sur-Seine, France

[22] Filed: July 30, 1974

[21] Appl. No.: 493,659

[30] Foreign Application Priority Data
Aug. 8, 1973  France .............................. 73.28952

[52] U.S. Cl. .................................. 55/159; 210/188; 210/436
[51] Int. Cl.² ........................................ B01D 29/42
[58] Field of Search ............. 55/158, 159, 189, 190; 210/188, 168, 349, 436

[56] References Cited
UNITED STATES PATENTS
3,199,676   8/1965   May .............................. 210/DIG. 5

Primary Examiner—John Adee
Attorney, Agent, or Firm—Cantor & Kraft

[57] ABSTRACT

A filter for liquids capable of containing a gas including a chamber for through-passage of a gas-charged liquid and which is subdivided into an upstream compartment and a downstream compartment by a filtering element, preferably in the form of a cylindrical strainer with a solid bottom, a liquid-supply pipeline opening into said upstream compartment, a liquid-outlet pipeline issuing from said downstream compartment, and an auxiliary conduit for exhaustion of gas directly communicating between said liquid-outlet pipeline and the upper part of said downstream compartment.

4 Claims, 1 Drawing Figure

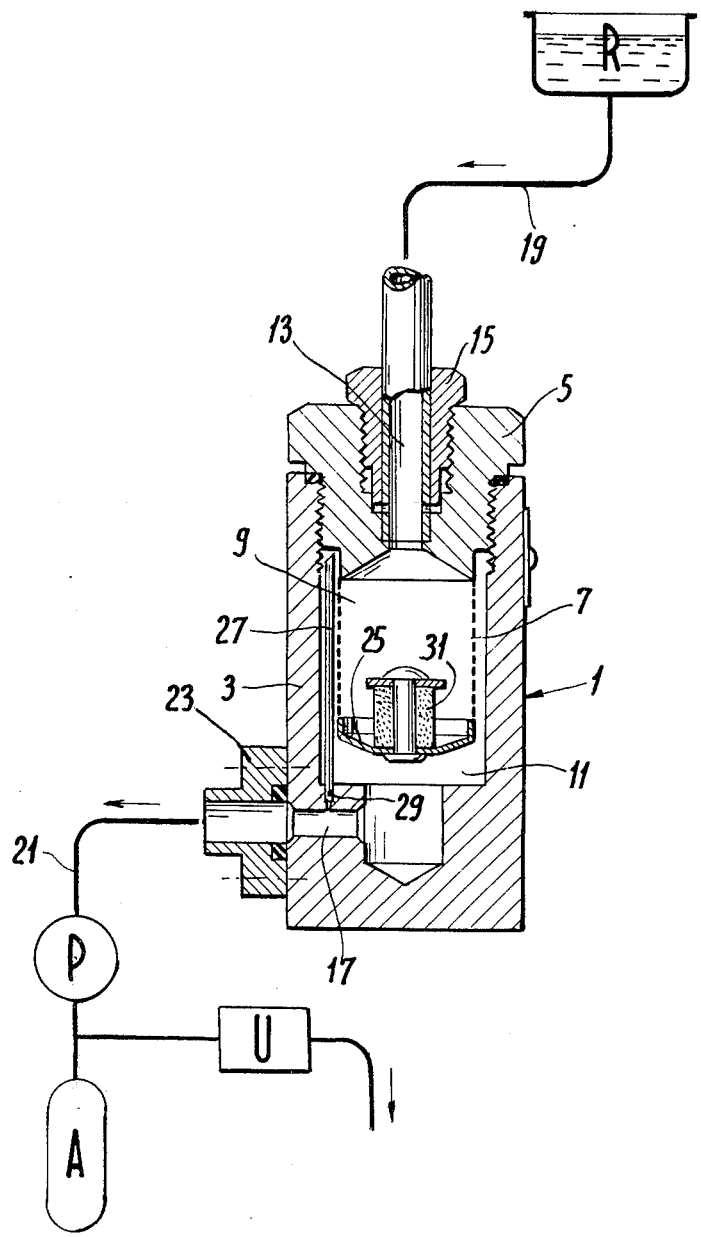

FILTER FOR LIQUIDS CAPABLE OF CONTAINING A GAS

The present invention relates to a filter for liquids capable of containing a gas and it relates in particular to oil filters situated upstream of a pump, in pressurized hydraulic control plants, when the presence of air in the oil may bring about operational irregularities, for example unpriming of the pump. The invention also relates to oil or fuel oil filters provided in lubricating circuits or fuel supply circuits for heat engines or heating plants.

In the following description, for purposes of simplification, the liquid to be filtered will be designated by the term "oil" and the gas contained in this liquid will be designated by the term "air".

It is well known to provide in hydraulic circuits filters intended to stop impurities which could be present in the oil originally or which could appear because of operation of the plant to which these hydraulic circuits are fitted. These filters often include fine-mesh strainers which may be metallic.

It is likewise known that oils may contain air because of stirring, splashing about, air admission, purging of pipelines, or other reasons, this air being present in the oil in the form of more or less minute bubbles, or in the dissolved state liable to escape in gaseous form because of variation of temperature or of pressure.

When the strainer of a filter is impregnated with oil, it becomes relatively impermeable to air, that is the very minute bubbles may pass through the meshes of the strainer with the oil which surrounds them, while the larger bubbles are retained by the meshes and may partially clog up the filter. On the other hand, the more minute bubbles having passed through the strainer may gather together into large bubbles downstream of the filter and cause unpriming of the pump.

An object of the present invention is to obviate or mitigate these various disadvantages.

According to the present invention, I provide a filter for liquids capable of containing a gas, said filter comprising a chamber for through-passage of a gas-charged liquid, a filtering element arranged in said chamber and subdividing said chamber into an upstream compartment, into which opens a liquid-supply pipeline, and a downstream compartment from which issues a liquid-outlet pipeline, and an auxiliary conduit for intake of gas directly communicating between said liquid-outlet pipeline and the upper part of said downstream compartment.

Preferably, the working section of the outlet pipeline is smaller than the working section of the supply pipeline, in order to increase the speed of the liquid and consequently reduce its pressure, in the outlet pipeline; moreover, said auxiliary conduit opens into said outlet pipeline through a constricted orifice functioning as an atomizer.

Thanks to this arrangement, when the pump located downstream of the filter draws the oil through the filter, it draws at the same time, by aspirator effect, through the auxiliary conduit, the air which has been able to collect in bubbles in the upper part of the filter chamber.

In other words, it can be said that with a filter according to the invention, the pump constantly draws a mixture of oil and occluded air, but with a very low air/oil ratio, which is not inconvenient in the normal operating conditions, whereas, with the known filters, the pump normally draws in oil but may occasionally come up against the situation of having nothing more than air to draw in, which unprimes same.

An embodiment of the invention will now be described, by way of example, with reference to the sole FIGURE of the accompanying drawing which represents a longitudinal section through a filter according to the invention.

Referring now to the drawing, the oil filter shown comprises a chamber 1 composed of a body 3 and a screw cap 5. In the interior of the chamber 1 there is arranged a filtering element or filter 7 which divides the chamber into an upstream compartment 9 and a downstream compartment 11. There opens into the upstream compartment 9 the oil supply pipeline 13 which is fastened in a leakproof manner in the cap 5 by a screw nut 15 with packing. There leaves from the downstream compartment 11 the oil outlet pipeline 17 which is bored through the body 3 of the filter.

In one example of use, the oil supply pipeline 13 is connected by a pipe 19 with a low pressure oil tank R, while the oil outlet pipeline 17 is connected, by a pipe 21 and a leakproof coupling 23, to a pump P. The pump P may, for example, supply an apparatus A adapted to use the oil, such as an hydraulic screw jack, and charge an oleopneumatic accumulator A, the oil used returning to the tank R.

The filtering element may be made up of a fine-mesh strainer 7, cylindrical in form, which is mounted in an oil and air tight manner on the cap 5 and the end of which is blanked off by a solid filter bottom 25.

According to the invention an auxiliary conduit 27 for inspiration of air directly connects the oil outlet pipeline 17 with the upper part of the downstream compartment where the air bubbles carried along by the oil through the filter tend to come together.

In the embodiment shown, this auxiliary conduit is constituted by a metal tube of small diameter, for example 1.5 or 2 mm., which is situated between the cylindrical strainer 7 and the internal wall of the filter chamber. The lower end of the tube is simply fitted into a hole 29 which is drilled in the bottom of the filter chamber and which opens into the outlet pipeline 17.

Preferably, the outlet pipeline 17 is of smaller working section than the oil supply pipeline 13, in order to increase the speed of the oil in the outlet pipeline and thus cause sucking in of the air by Venturi effect. The reduction in diameter between the two pipelines may be of the order of 30 to 40%.

In order to restrict the discharge of air, the hole 29, into which the tube 27 is fitted, opens into the outlet pipeline 17 through a calibrated orifice of small diameter, for example 1 mm., functioning as a nozzle.

It will thus be appreciated from the foregoing that, as soon as circulation of oil is established through the filter (in the embodiment shown, as soon as the pump has been started), the air which is liberated from the oil is sucked progressively into the tube 27 and mixes with the oil drawn off, without it the possibility of a large quantity of air accumulating in the filter with the chance of bringing about unpriming of the pump or any other irregularity of operation of the apparatus due to a compressible socket of air.

Preferably, in a filter in accordance with the invention, the rise of the air bubbles towards the upper part of the downstream compartment (part where these bubbles are sucked in by the tube 27) is assisted by giving the bottom 25 of the filtering element a curved shape, with the convexity facing downstream, this avoiding dwell of the air bubbles and accumulation thereof at the bottom of the filter chamber.

Likewise, in order to avoid in the upstream compartment 9 the dwell of air bubbles against the upper surface of the chamber, the upper internal wall of this compartment, the wall which in the present embodiment is constituted by the lower end of the cap 5, is preferably given a concave shape, for example frustoconical. The rise of the bubbles is thus assisted. Finally, just as is usual, there may be arranged within the filter a permanent magnet 31 which collects metallic impurities in suspension in the oil.

Naturally the invention is not limited to the embodiment described and shown and is susceptible to many modifications open to those skilled in the art without thereby departing from the scope of the invention as defined in the appended claims.

I claim:

1. A filter for liquids capable of containing a gas, said filter comprising a chamber for through-passage of a gas-charged liquid; a filtering element arranged in said chamber and subdividing said chamber into an upstream compartment and a downstream compartment; a liquid-supply pipeline opening into said upstream compartment; a liquid-outlet pipeline issuing from said downstream compartment, the working section of the outlet pipeline being smaller than the working section of the supply pipeline; and an auxiliary conduit for intake of gas directly communicating between said liquid-outlet pipeline and the upper part of said downstream compartment, said auxiliary conduit opening into said outlet pipeline through a constricted orifice functioning as a nozzle.

2. The filter as set forth in claim 1, in which said supply pipeline is located at the upper part of said chamber and at least the upper interior wall of the upstream compartment is concave in shape, the supply pipeline opening into the top of said concave interior wall.

3. The filter as set forth in claim 2, in which the filtering element consists of a cylindrical strainer having a solid bottom of convex shape with the convexity facing the downstream compartment.

4. The filter as set forth in claim 3, in which a magnet is arranged in the upstream compartment in the interior of the filtering element.

* * * * *